United States Patent [19]

Kurtz

[11] Patent Number: 5,176,793
[45] Date of Patent: Jan. 5, 1993

[54] METHOD OF TREATING AND A DISPERGER FOR DISINTEGRATING WOOD PULP, ESPECIALLY CONTAINING WASTE PAPER

[75] Inventor: Rudolf W. Kurtz, Huskvarna, Sweden

[73] Assignee: Cellwood Machinery AB, Nassjo, Sweden

[21] Appl. No.: 651,213
[22] PCT Filed: Aug. 30, 1989
[86] PCT No.: PCT/SE89/00453
§ 371 Date: Feb. 12, 1991
§ 102(e) Date: Feb. 12, 1991
[87] PCT Pub. No.: WO90/02223
PCT Pub. Date: Mar. 8, 1990

[30] Foreign Application Priority Data

Aug. 30, 1988 [SE] Sweden .............................. 8803033

[51] Int. Cl.⁵ .............................................. D21B 1/08
[52] U.S. Cl. ........................................ 162/4; 162/56; 162/23; 162/52
[58] Field of Search .................. 162/4, 56, 23, 52, 61; 241/260.1

[56] References Cited

U.S. PATENT DOCUMENTS

| | | |
|---|---|---|
| 3,057,769 | 10/1962 | Sandberg ............................ 162/4 |
| 3,467,574 | 9/1969 | West ................................... 162/24 |
| 4,219,381 | 8/1980 | Schnell ............................... 162/4 |
| 4,326,913 | 4/1982 | Mattsson ............................ 162/17 |
| 4,350,499 | 9/1982 | Lundgren ........................... 162/18 |
| 4,431,482 | 2/1984 | Heinbockel et al. .............. 162/4 |
| 4,851,111 | 7/1989 | Martin et al. ..................... 209/273 |
| 4,878,997 | 11/1989 | Reinhall ............................. 162/23 |
| 4,921,573 | 5/1990 | Beier ................................. 162/4 |

Primary Examiner—W. Gary Jones
Assistant Examiner—Brenda Lamb
Attorney, Agent, or Firm—Sughrue, Mion, Zinn, Macpeak & Seas

[57] ABSTRACT

In a method of treating wood-fibre pulp, particularly pulp which contains recycled paper, the pulp is dewatered and then heated by means of superheated steam under pressure prior to being passed to a disperser (10), in which the pulp is finely divided. The pulp is passed from the dispenser to a plug-outfeed screw (20) withouth separate departure of steam from the system. One end of the screw is closed by means of a valve device (21), so that the pulp carried by the screw will be compated to form a plug which seals the system. The valve device (21) located at one end of the screw (20) is constructed to open when the pressure exerted thereon by the plug exceeds a pre-determined value. The invention also relates to a disperser (10) having a substantially rectangular outlet which is connected to a plug-screw (20) of the above kind.

9 Claims, 1 Drawing Sheet

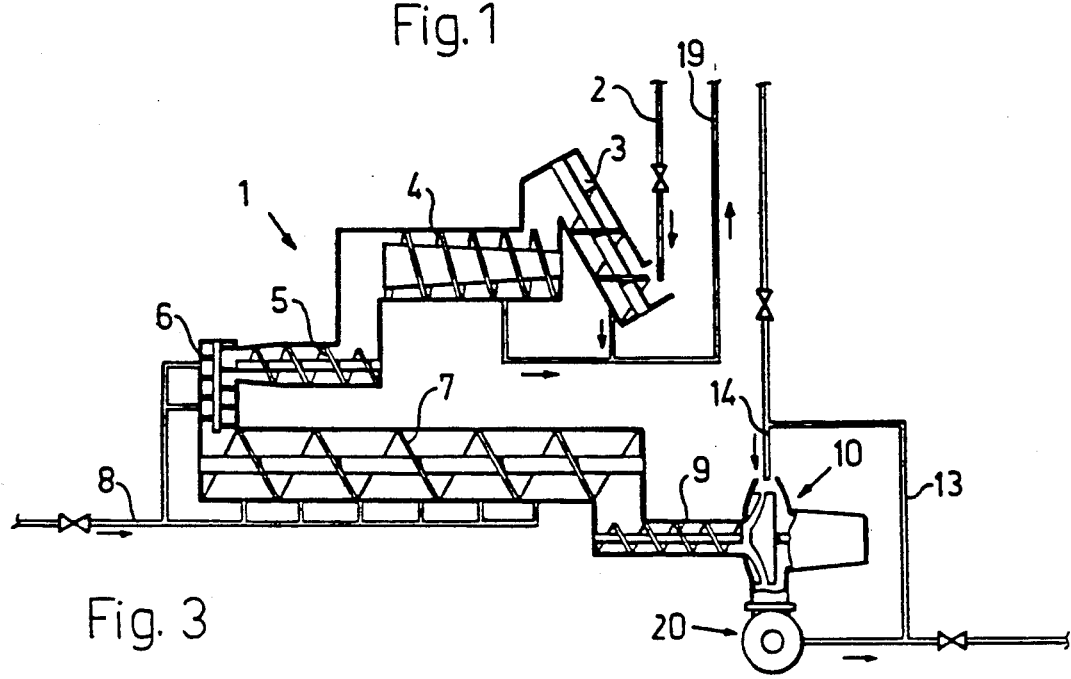
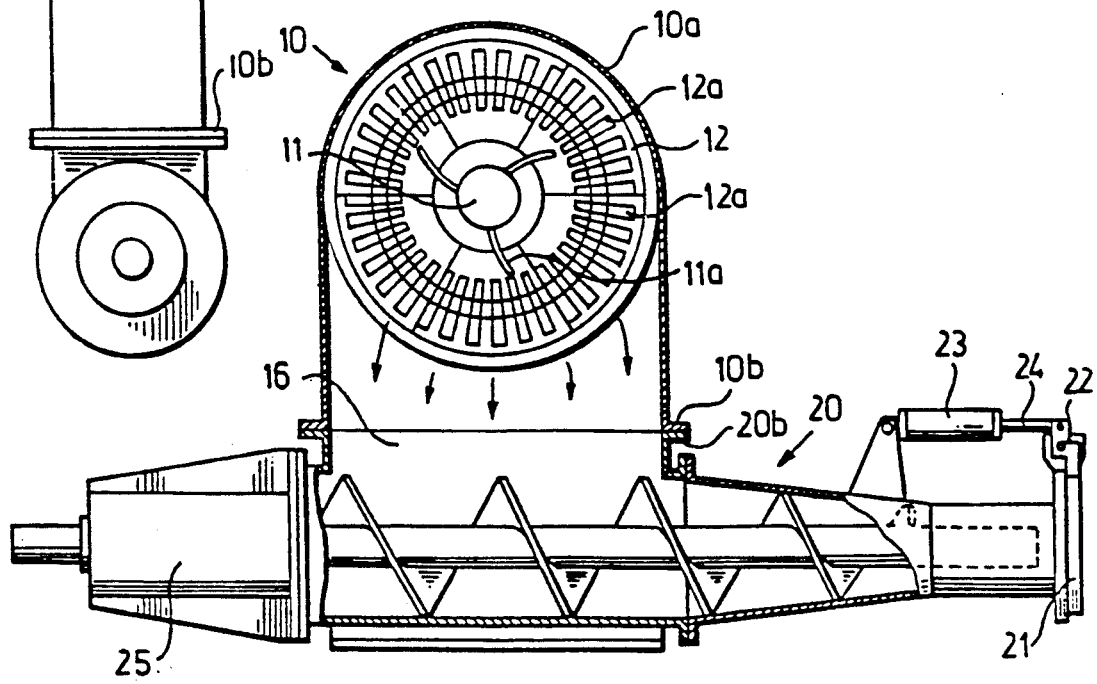

METHOD OF TREATING AND A DISPERGER FOR DISINTEGRATING WOOD PULP, ESPECIALLY CONTAINING WASTE PAPER

FIELD OF THE INVENTION

The present invention relates to a method of treating wood-fiber pulp, particularly pulp which contains waste or recycled paper.

According to another aspect, the invention relates to a disperger or disperser for finely-dividing wood-fiber pulp.

When treating such pulp in accordance with conventional techniques, the pulp is processed in a plurality of treatment stages, including dewatering of the pulp in a dewatering zone by means of a screw-press, so as to increase the pulp consistency from an input value of from 4–6% to an outgoing value of about 30%.

The pulp is passed from the dewatering zone to a heating zone, in which the pulp is advanced while steam is supplied to the zone. The pulp is processed in this zone by means of a so-called pulp shredder, which converts the pulp into granules or small particles or some like form, so as to enable the pulp to be heated quickly and uniformly to the temperature desired with the aid of saturated steam. The average steam consumption is about 300 kg/ton pulp.

The heated and finely-divided pulp is then passed to a disperser, which enables the pulp material to be worked gently at high consistencies. This is made possible by the mutually opposing toothed disks of the disperser, of which one disk rotates relative to the other. The dispersion-gap is adjusted during operation, suitably by means of an electro-hydraulic system.

The temperature of the pulp processed may be varied between, for instance, 80° and 120° C., depending on the nature of the pulp being processed. The fibers present in the pulp are liable to be destroyed or damaged when excessively high temperatures are used.

The pulp exiting from the heating zone may have a consistency of up to 30%. This consistency is reduced to some extent by the pressurized steam delivered to said zone.

Diluting or thinning water is normally added during the dispersion process, and the consistency of the pulp pumped from the disperser will consequently lie between 3.5 and 6%. The pulp consistency, however, may be as high as about 10% in some cases.

Somewhere above 12–13% lies a limit at which it is no longer possible to pump the pulp with the aid of present day techniques.

There are many instances, however, when pulp of higher consistencies are required, where values of 25–30%, or still higher, may be strived for. Such consistencies, however, are not possible to achieve with the aid of pulp-processing methods hitherto applied.

At the same time, there is a desire to increase the temperature and/or the pressure of the steam supplied, this desire being particularly manifest in those instances when pulped highly-contaminated recycled paper is processed.

Difficulties are encountered, however, in recovering the heat-content of steam effectively. For instance, there is a risk that the steam will be blown from the system and consequently not utilized to the fullest.

Examples of the present state of this art are found in SE,B,435 532 and FI,B,66927 (both Sunds Defibrator) and FI,B,58171 (Keskuslaboratorio). In the case of these known methods and apparatus, the steam is removed and discharged through separate steam outlets, so as to enable the steam to be re-used.

None of these known methods relates to the treatment of pulp containing recycled paper, particularly highly-contaminated paper.

SUMMARY OF THE INVENTION

A prime object of the present invention is to provide an improved method for the treatment of wood-fiber pulp which will enable the heat-content of the steam supplied to the heating zone to be utilized in a nore efficient manner, thereby to enable highly-contaminated recycled paper to be treated more effectively, and to increase the pulp consistency of the treated final product.

A further object is to provide a treatment method which can be adapted to prevailing parameters of the treated product with the aid of simple means, and which will provide a good result when the temperature prevailing during the treatment process varies between values which lie beneath and substantially above 100° C., and which will produce a final product at pulp consistencies which have hitherto been considered unattainable.

A further object of the present invention is to provide apparatus for treating wood-fiber pulp, particularly wood-fiber pulp that contains recycled paper, which will enable the heat-content of the steam supplied to be utilized more efficiently without incurring structural complications of an essential nature, and which will permit simple adjustments and controls to be made in dependence on the extent to which the pulp is contaminated and on other qualities of the pulp, and which can be readily regulated in dependence on the desired properties of the final product, and particularly with respect to the consistency of the ingoing pulp.

Accordingly, one aspect of this invention consists in a method of the aforesaid kind which is characterized by the steps of passing the finely-divided pulp from the disperser to a screw press of which one end is closed, without separate departure of the steam, such as to form a prevailing, sealing plug of compacted pulp.

The plug formed in the screw press creates an effective seal against the departure of steam from the system, therewith enabling the pulp-consistency of the treated final product to be increased.

Thus, the inventive method enables pulp consistencies of 30% or higher to be achieved.

It is also possible to increase the steam-temperature in the heating zone, which is particularly advantageous when treating highly-contaminated recycled paper. It is possible, within the scope of the invention, to use temperatures of up to 120° C. or even higher temperatures. The pressure of the steam delivered to the heating zone can also be increased, to improve the yield of the treatment process.

It is preferred in practice to close said one end of the screw press with the aid of a valve device which is activated by counter-pressure and which will open when the pressure exerted by the plug on said valve exceeds a pre-determined value.

The higher the counter-pressure exerted by the valve device, the harder or denser the plug and the more effectively contaminants are extracted from the pulp.

It also lies within the scope of the present invention to regulate the pressure and temperature of the steam and also to adjust the counter-pressure exerted by the valve in dependence on the extent to which the pulp is contaminated.

According to another aspect, the invention relates to a disperser intended for finely-dividing dewatered and heated wood-fiber pulp, and being of the aforedescribed kind which is characterized in that the outlet for finely-divided pulp discharges into a screw-press, by means of which the pulp is advanced without the separate departure of steam; and in that one end of the screw press is closed by means of a valve device such that the advancing pulp will be compacted and form a plug seal at said one end.

Other features of the inventive apparatus are set forth in the depending apparatus claims.

So that the invention will be more readily understood and further features thereof made apparent, an exemplifying embodiment of the invention will now be described in more detail with reference to the schematic drawings.

BRIEF DESCRIPTION OF THE DRAWINGS

FIG. 1 illustrates the principle construction of some of the components of a processing plant for carrying out the method according to the invention.

FIG. 2 is a side view, partly cut-away, of a disperser forming part of the processing plant, and illustrating the manner in which the disperser co-acts with a screw-press or "plug-outfeed screw" in a manner to produce a pulp-plug which seals the system.

FIG. 3 is an end view of the arrangement illustrated in FIG. 2.

DETAIL DESCRIPTION OF THE PREFERRED EMBODIMENT

FIG. 1 illustrates schematically some of the essential components of a plant intended for the treatment of pulp which contains recycled paper.

The pulp is passed through a conduit 2 to a screw-type dewatering device 3, in which the pulp is dewatered from an input consistency of 2%, to an output consistency of 8%, the water pressed from the pulp being discharged through a conduit 19.

The dewatering zone also includes a screw press 4, which increases the pulp consistency from an input value of 6% to an output value of 30%. The screw is coated with hardmetal. The screw press is designed such that all parts of the dispersing system are readily accessible. The pulp is then transferred by a plug screw 5 and a vertical conveyor screw 6 to a pulp shredder 7 located in the heating zone of the treatment plant. Steam is introduced to different locations along the axial length of the pulp shredder, through a manifold inlet system 8. The pressure and temperature of the steam is varied in dependence on the extent to which the ingoing pulp is contaminated.

The pulp shredder converts the mass-plug into a particle form, thereby enabling the pulp to be heated uniformly and quickly. The finely-divided pulp can, in this way, be heated effectively to the temperature desired, with the aid of saturated steam. The steam overpressure is controlled with the aid of appropriate valve devices.

The heated pulp-granules are transferred from the pulp shredder 7, via a conveyor screw 9, to a disperser 10, which is illustrated in larger scale in FIG. 2, with parts of the disperser cut-away.

As will be seen in FIG. 2, the disperser comprises a housing 10a provided with an inlet through which the pulp is delivered axially to a central infeed zone.

The disperser includes a rotor 11 which is driven by an electric motor and which carries pump-vanes on the end thereof located in the vicinity of the infeed zone. The rotor also carries a disk 12 having a peripheral section provided with teeth 12a. These teeth are intended to coact with teeth on a toothed ring or disk rigidly mounted on the housing, such as to finely-divide the pulp entering the disperser. Dilution water is delivered to the disperser through conduits 13, 14.

The disperser also comprises an outlet 16 which is connected to the housing by means of a flange 10b.

The flange-connection 10b of the outlet 16 is connected to a corresponding flange-connection 20b of a screw-press or plug outfeed screw 20. Provided at one end of the screw 20 is a flap-valve 21 which is pivotally mounted on a pivot journal 22 and activated by a pneumatic piston-cylinder device 23, 24. The setting of the piston-cylinder device is adjusted, by means of adjusting means (not shown), so that the flap valve 21 will exert a pre-determined counter-pressure against the pulp plug formed at said one end of the screw 20. The flap-valve will thus open when the pressure exerted by the plug exceeds said pre-determined pressure, whereby the plug will be discharged from the screw at the desired pulp consistency e.g. a pulp consistency of 30% or more.

As will be understood from the foregoing, the pulp-plug will function to seal the system, so that the heat content of the steam delivered to the system at overpressure and relatively high temperature, e.g. a temperature of 110°–120° C., can be utilized in the most effective manner possible.

The pressure and temperature of the steam delivered to the system are adjusted appropriately when the pulp treated is highly contaminated. Similarly, the counter-pressure exerted by the piston-cylinder device 23 on the flap-valve 21 is also adjusted in dependence on the extent to which the pulp is contaminated.

It will be seen from FIGS. 2 and 3 that the flange connections 10b, 20b located between the disperser and the screw 20 have a rectangular cross-section, wherewith the internal measurement of the disperser outlet and the screw inlet, i.e. the through-flow area of the pulp transferred from the disperser to the screw will correspond approximately to the diameter of the rotor disk 12 multiplied by the total width of the disperser in the region of the mutually co-acting toothed disks. As before mentioned, the provision of a plug-outfeed screw of the aforesaid kind in direct connection with the disperser will enable the consistency of the pulp product to be raised to 30% or more, and will also enable the energy content of the steam supplied to the system to be recovered effectively, since the pulp-plug formed at said one end of the screw 20 will effectively seal the system, such that the heat content of the steam supplied will be utilized in the best possible manner.

The configuration of the disperser outlet is significant insomuch as it is impossible to pump high-consistency pulp through a narrow conduit or a narrow space with the aid of the disperser.

Consequently, as indicated with the illustrated embodiment, the disperser outlet has relatively large dimensions. The manner in which the outlet is arranged in other respects or how the disperser and the plug-outfeed screw are arranged in relation to one another is not essential to the invention. The only essential feature in this respect is that the two units together form a closed system and that the pulp-plug formed in the screw assist in preventing steam from escaping the system.

The components located in the treatment system upstream of the disperser can vary in accordance with prevailing requirements.

Finally, it is emphasized that it is not possible at the present time to state precisely which treatment temperatures can be applied or which pulp concentrations can be achieved within the scope of the present invention. It has been established, however, that the invention enables considerably higher working temperatures to be used and results in a considerably higher pulp consistency than was hitherto considered possible. The numerical information recited in this respect are to be considered as approximate and do not exclude the possibility of higher values when applying the present invention.

I claim:

1. A dispersing system for treating a wood-fiber pulp which contains a recycled paper, the dispersing system comprising a pulp shredder, means for introducing steam to the pulp shredder, and a dispenser for finely-dividing the wood-fiber pulp containing the recycled paper, said disperser including:
a) a housing (10a) having an inlet for the introduction of the pulp to an inlet zone in a substantially axial direction;
b) a rotor (11) which in the region of the inlet zone carries pump-vanes;
c) a disk (12) which is carried by the rotor and which has a peripheral section provided with teeth (12a) which co-act with opposing teeth on a ring or disk which is rigidly mounted, in the housing (10a), for finely-dividing the pulp; and
d) a finely-divided pulp outlet 16 having a connecting piece (10b), said connecting piece (10b) having a substantially rectangular cross-section an inner measurement of said connecting piece corresponding approximately to the diameter of the rotor disk (12) and a total width of the disperser in the region thereof occupied by the toothed disks;

said dispersing system further comprising a screw-press (20) which is connected to the connecting piece of the finely-divided pulp outlet and which functions to advance the pulp, without separate departure of steam, towards one end of the screw-press; said one end of said screw-press being closed by means of a valve device (21) such that the pulp will be compacted to form a plug seal in the vicinity of said one end of the screw-press thereby to prevent escape of steam from the dispersing system.

2. The dispersing system according to claim 1, wherein the valve device (21) is held closed by a pneumatically operating mechanism (22, 23, 24) which permits opening of said valve when a pressure of the formed plug seal exerted on said valve exceeds a predetermined value.

3. A method for treating wood-fiber pulp which contains a recycled paper, said method comprising the steps of:
a) passing the pulp through a dewatering zone;
b) delivering the pulp to a heating zone and advancing the pulp through said heating zone while supplying steam to said heating zone;
c) finely-dividing the pulp in a disperser;
d) delivering the finely-divided pulp from the disperser, without separate departure of steam, to a screw press of which one end is closed; and
e) compacting the finely-divided pulp with the screw press so as to form a plug seal at said one end of the screw press thereby to prevent escape of steam from the screw press;
wherein said one end of the screw press is closed by means of a counter-pressure exerting valve device;
further comprising the step of opening said counter-pressure exerting valve device when a pressure exerted by the plug seal thereon exceeds a predetermined value; and
further wherein said recycled paper is highly contaminated; and further comprising the steps of:
regulating the pressure and temperature of the steam delivered to said heating zone and adjusting a counter-pressure exerted by the valve device depending on an extent of contamination of said recycled paper.

4. The method according to claim 3, wherein the step of delivering the pulp to the screw press includes delivering the pulp at a temperature greater than 100° C.

5. The method according to claim 3, wherein the step of delivering the pulp to the screw press includes delivering the pulp at a temperature greater than 110° C.

6. The method according to claim 3, wherein the step of delivering the pulp to the screw press includes delivering the pulp at a temperature greater than 120° C.

7. The method according to claim 3, further comprising the step of delivering diluting water to the disperser, such that the pulp consistency of the plug seal formed in the screw press exceeds 10%.

8. The method according to claim 3, further comprising the step of delivering diluting water to the disperser, such that the pulp consistency of the plug seal formed in the screw press exceeds 20%.

9. The method according to claim 3, further comprising the step of delivering diluting water to the disperser, such that the pulp consistency of the plug seal formed in the screw press exceeds 30%.

* * * * *